United States Patent [19]
Wideman et al.

[11] Patent Number: 5,883,139
[45] Date of Patent: Mar. 16, 1999

[54] PROCESS FOR IMPROVING THE PROPERTIES OF GROUND RECYCLED RUBBER

[75] Inventors: Lawson Gibson Wideman, Tallmadge; George Frank Balogh, North Canton; Raymond Dean McQuate, Wadsworth, all of Ohio

[73] Assignee: The Goodyear Tire & Rubber Company, Akron, Ohio

[21] Appl. No.: 27,312

[22] Filed: Feb. 20, 1998

[51] Int. Cl.⁶ .................................................. C08J 11/04
[52] U.S. Cl. .................. 521/43.5; 521/41; 521/42.5; 521/44.5; 521/45.5; 528/487; 528/491; 528/493; 528/495; 528/497; 524/62; 524/113; 524/115; 524/261; 524/319; 524/356; 524/366; 241/16; 241/17; 525/88; 525/191; 525/331.7; 525/331.8
[58] Field of Search .................... 521/41, 42.5, 43.5, 521/44.5, 45.5; 528/487, 491, 493, 495, 497; 524/62, 113, 115, 261, 319, 356, 366; 241/16, 17; 525/88, 191, 331.7, 331.8

[56] References Cited

U.S. PATENT DOCUMENTS

| | | | |
|---|---|---|---|
| 4,613,087 | 9/1986 | Snyder | 241/111 |
| 5,304,576 | 4/1994 | Martinez | 521/41 |
| 5,634,599 | 6/1997 | Khais et al. | 241/23 |

FOREIGN PATENT DOCUMENTS

| | | |
|---|---|---|
| 0780429 | 6/1997 | European Pat. Off. . |

*Primary Examiner*—Samuel A. Acquah
*Attorney, Agent, or Firm*—Bruce J Hendricks

[57] ABSTRACT

A process involving (a) homogeneously dispersing tetrathiodipropionic acid in a recycled rubber having an individual particle size no greater than 420 microns, (b) mixing the treated recycled rubber with unvulcanized rubber and (c) vulcanizing the rubber mixture.

11 Claims, No Drawings

PROCESS FOR IMPROVING THE PROPERTIES OF GROUND RECYCLED RUBBER

BACKGROUND OF THE INVENTION

It is often desired to reclaim or recycle vulcanized rubber. The vulcanized rubber is generally in the form of a manufactured article such as a pneumatic tire, industrial conveyor or power transmissions belt, hose and the like. Scrap pneumatic tires are especially large source of such vulcanized rubber.

The vulcanized rubber is conventionally broken down and reclaimed or recycled by various processes, or combination of processes, which may include physical breakdown, grinding, chemical breakdown, devulcanization and/or cryogenic grinding. If the vulcanized rubber contains wire or textile fiber reinforcement, then it is generally removed by various processes which might include a magnetic separation, air aspiration and/or air floatation step.

In this description, the terms "recycle" and "recycled rubber" are used somewhat interchangeably and relate to both vulcanized and devulcanized rubber which is more completely hereinafter described. It is important to appreciate that devulcanized recycle or recycled rubber (sometimes referred to as reclaim rubber) relates to rubber which had been vulcanized followed by being substantially or partially devulcanized.

The resultant recycle rubber that had been devulcanized is a polymeric material which has somewhat the appearance of unvulcanized rubber but has important differences and properties therefrom. First, it is a rubber which is, in essence, a partially vulcanized rubber composed of a mixture of polymer units of various and numerous constructions different from either unvulcanized or vulcanized rubber.

Secondly, the recycled rubber, unlike conventional unvulcanized rubber, is also a complex mixture of largely unknown polymer(s), of compounding ingredients, possibly bits of textile fiber, and the like.

It has been observed that, after adding sulfur and accelerator to recycle rubber, followed by its revulcanization, the resulting physical properties, such as tensile and elongation, are usually lower than the corresponding properties of the original vulcanized rubber from which it was derived. It has also sometimes been observed that exposed edges of bales or slabs of recycle rubber have tended to curl up, apparently a result of oxidation degradation which was probably due to a deficiency of antidegradants which would normally have been adequately present in unvulcanized, compounded rubber.

SUMMARY OF THE INVENTION

The present invention relates to a process for improving the properties of ground recycled rubber.

DETAILED DESCRIPTION OF THE INVENTION

There is disclosed a process for improving the properties of ground recycled rubber comprising (a) homogeneously dispersing from 0.18 to 10.0 phr of 3,3'-tetrathiodipropionic acid in a recycled rubber compound which has an individual particle size no greater than 420 microns to form a treated recycled rubber compound;

(b) mixing from 1 to 40 parts by weight of said treated recycled rubber compound with 60 to 99 parts by weight of at least one unvulcanized rubber to form a recycled/unvulcanized rubber compound;

(c) heating the recycled/unvulcanized rubber compound for a time sufficient and at a temperature to vulcanize all of the rubber in the recycled/unvulcanized rubber compound.

The recycle rubber should have a particle size no greater than 420 microns (40 mesh). Any particles greater than this render it impractical for subsequent mixing with the unvulcanized rubber. Generally speaking, the individual particle size should have a particle size no greater than 250 microns (60 mesh) and preferably smaller than 177 microns (80 mesh). Preferably, the individual particle size ranges from 250 microns (60 mesh) to 74 microns (200 mesh).

The tetrathiodipropionic acid is dispersed in the recycle rubber in an amount ranging from 0.18 to 10.0 phr. Preferably, the level of tetrathiodipropionic acid that is dispersed ranges from 0.36 to 5.0 phr.

The tetrathiodipropionic acid may be dispersed directly on the recycle rubber or be suspended or dissolved in a solvent and thereafter applied to the recycled rubber. Representative examples of such solvents include acetone, chloroform, dichloromethane, carbon tetrachloride, hexane, heptane, cyclohexane, xylene, benzene, dichloroethylene, dioxane, diisopropyl ether, tetrahydrofuran and toluene. Preferably, the solvent is acetone.

The recycled rubber having dispersed therein or thereon the tetrathiodipropionic acid is interchangeably referred to herein as "treated recycled rubber." The treated recycled rubber is mixed with unvulcanized rubber. From 1 to 40 parts by weight of the treated recycle rubber is mixed with 60 to 99 parts by weight of at least one unvulcanized rubber to form a recycle/unvulcanized rubber compound. Preferably, from 2 to 30 parts by weight of the treated recycle rubber is mixed with from 70 to 98 parts by weight of at least one unvulcanized rubber.

Representative examples of unvulcanized rubber which may be mixed with the treated recycle rubber include various synthetic rubbers. Representative synthetic polymers include the homopolymerization products of butadiene and its homologues and derivatives, as for example, methylbutadiene, dimethylbutadiene and pentadiene as well as copolymers such as those formed from butadiene or its homologues or derivatives with other unsaturated organic compounds. Among the latter are acetylenes, for example, vinyl acetylene; olefins, for example, isobutylene, which copolymerizes with isoprene to form butyl rubber; vinyl compounds, for example, acrylic acid, acrylonitrile (which polymerizes with butadiene to form NBR), methacrylic acid and styrene, the latter polymerizing with butadiene to form SBR, as well as vinyl esters and various unsaturated aldehydes, ketones and ethers, e.g. acrolein, methyl isopropenyl ketone and vinylethyl ether. Also included are the various synthetic rubbers prepared by the homopolymerization of isoprene and the copolymerization of isoprene and other diolefins in various unsaturated organic compounds. Also included are the synthetic rubbers such as 1,4-cis-polybutadiene and 1,4-cis-polyisoprene and similar synthetic rubbers.

Specific examples of synthetic rubbers include neoprene (polychloroprene), polybutadiene (including trans- and cis-1,4-polybutadiene), polyisoprene (including cis-1,4-polyisoprene), butyl rubber, halobutyl rubber copolymers of 1,3-butadiene or isoprene with monomers such as styrene, acrylonitrile and methyl methacrylate, as well as ethylene/propylene/diene monomer (EPDM) and in particular ethylene/propylene/dicyclopentadiene terpolymers. The preferred rubbers for use in the present invention are natural rubber, polybutadiene, polyisobutylene, EPDM, butadiene-styrene copolymers, cis-1,4-polyisoprene, styrene-isoprene copolymer, butadiene-styrene-isoprene copolymers, polychloroprenes and mixtures thereof.

As can be appreciated by one skilled in the art, any of the above recited unvulcanized rubbers may be the same kind or different kind of rubber that is found in the ground recycled rubber.

In order to cure the rubber composition of the present invention, one adds a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

Conventional rubber additives may be incorporated in the rubber stock of the present invention. The additives commonly used in rubber stocks include fillers, plasticizers, waxes, processing oils, peptizers, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representative carbon blacks that are commonly used in rubber stocks include N110, N121, N220, N231, N234, N242, N293, N299, S315, N326, N330, M332, N339, N343, N347, N351, N358, N375, N472, N539, N582, N630, N642, N660, N754, N762, N765, N774, N990 and N991. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Typical peptizers may be, for example, pentachlorothiophenol and dibenzamidophenyl disulfide. Such peptizers are used in amounts ranging from 0.1 to 1 phr. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, tall oil fatty acids, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate, disulfide or thiuram compound.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

Siliceous pigments may be used in the rubber compound applications of the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical. Society, Volume 60, page 304 (1930). The silica may also be typically characterized by having a dibutyl phthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. Generally speaking, the amount of silica may range from 5 to 120 phr. The amount of silica will generally range from about 5 to 120 phr. Preferably, the amount of silica will range from 10 to 30 phr.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, polymerized trimethyldihydroquinoline and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

The rubber compound of the present invention may be used as a wire coat or bead coat for use in a tire. Any of the cobalt compounds known in the art to promote the adhesion of rubber to metal may be used. Thus, suitable cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate, cobalt neodecanoate, cobalt carboxylate and an organo-cobalt-boron complex commercially available under the designation Manobond C from Wyrough and Loser, Inc, Trenton, New Jersey. Manobond C is believed to have the structure:

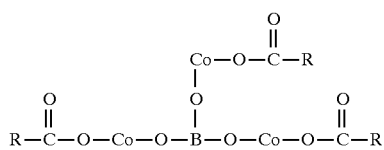

in which R is an alkyl group having from 9 to 12 carbon atoms.

Amounts of cobalt compound which may be employed depend upon the specific nature of the cobalt compound selected, particularly the amount of cobalt metal present in the compound. Since the amount of cobalt metal varies considerably in cobalt compounds which are suitable for use, it is most appropriate and convenient to base the amount of the cobalt compound utilized on the amount of cobalt metal desired in the finished stock composition.

The amount of the cobalt compound may range from about 0.1 to 2.0 phr. Preferably, the amount of cobalt compound may range from about 0.5 to 1.0 phr. When used, the amount of cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The sulfur vulcanizable rubber compound is cured at a temperature ranging from about 125° C. to 180° C. Preferably, the temperature ranges from about 135° C. to 160° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The rubber composition may be used in forming a composite with reinforcing material such as in the manufacture of tires, belts or hoses. Preferably, the composition of the present invention is in the form of a tire and more specially as a component of a tire, including, the tread, wirecoat, beadcoat and plycoat.

EXAMPLE 1

Added to a 1-liter open-top glass reactor containing 220 grams of GF80 ground recycle rubber from Rouse Rubber Industries, Inc, of Vicksburg, Miss., was 4.4 grams of 3,3' tetrathiodipropionic acid (TTDP) dissolved in 325 ml of acetone. According to the sieve analysis on the specification sheet, GF80 contains 88 percent by weight of particles that pass through 100 mesh, 95 percent by weight of particles that pass through 80 mesh and 100 percent by weight of particles that pass through a 60 mesh. The TGA analysis for GF80 is 13.74 percent by weight volatiles, 6.74 percent ash, 29.55 percent carbon black and 49.94 percent rubber hydrocarbon. The ground rubber was stirred as the solvent was distilled at room temperature under a reduced pressure of 29 inches of Hg vacuum to homogeneously disperse the TTDP on the ground recycle rubber. The treated recycle was dried at 100° C. for 4 hours in a drying oven.

For the purposes of control, the above procedure was duplicated with the exception that dithiodipropionic acid (DTDP) was substituted for the tetrathiodipropionic acid.

EXAMPLE 2

Four rubber formulations were prepared to compare and contrast the importance of the use of ground recycled rubber, ground recycle rubber with dithiodipropionic acid and ground recycled rubber with tetrathiodipropionic acid. Each rubber formulation contained 96.25 parts by weight of PLF 1712C (70 parts by weight SBR and 26.25 oil) and 37.50 parts by weight of Budene® 1254 (30 parts by weight polybutadiene and 7.50 parts by weight oil). PLF 1712 is an oil extended emulsion polymerized styrene butadiene rubber marketed by The Goodyear Tire & Rubber Company. Budene® 1254 is an oil extended polybutadiene rubber marketed by The Goodyear Tire & Rubber Company. Each rubber formulation also contained the same conventional amounts of processing oil, peptizer, fatty acids, antidegradants, waxes, zinc oxide, primary and secondary accelerators and sulfur. Each formulation differed by the additional ingredients listed in Table I. The rubber formulations were prepared in a two-stage Banbury™ mix. All parts and percentages are by weight unless otherwise stated. Samples 1–3 are Controls and Sample 4 represents the present invention.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table II reports cure properties that were determined from cure curves that were obtained for the rubber stocks that were prepared. These properties include a torque minimum (Min. Torque), a torque maximum (Max. Torque), the difference between Max Torque and Min Torque (Delta Torque), Final Torque (Final Torq) minutes to 1 percent of the torque increase (t1), minutes to 25 percent of the torque increase (t25), minutes to 50 percent of the torque increase (t50), minutes to 75 percent of the torque increase (t75) and minutes to 90 percent of the torque increase (t90).

TABLE I

| Sample No. | 1 | 2 | 3 | 4 |
|---|---|---|---|---|
| Reclaim Rubber[1] | 0 | 20.00 | 0 | 0 |
| Reclaim Rubber[2] with DTDP | 0 | 0 | 20.41 | 0 |
| Reclaim Rubber[2] with TTDP | 0 | 0 | 0 | 20.41 |
| Min Torq | 6.4 | 7.9 | 8.0 | 8.5 |
| Max Torq | 27.7 | 26.3 | 27.1 | 29.2 |
| Delta Torq | 21.3 | 18.4 | 19.1 | 20.7 |
| Final Torq | 27.0 | 25.8 | 26.8 | 28.9 |
| t 1 (min) | 7.5 | 6.4 | 7.6 | 6.7 |
| t 25 (min) | 9.4 | 8.1 | 9.7 | 8.7 |
| t 50 (min) | 10.8 | 9.5 | 11.3 | 10.2 |
| t 75 (min) | 12.8 | 11.5 | 13.5 | 12.6 |
| t 90 (min) | 16.2 | 14.3 | 16.9 | 16.2 |
| ATS 18 min/150°C. | | | | |
| 100% Modulus | 1.11 | 1.10 | 1.10 | 1.21 |
| 150% Modulus | 1.47 | 1.43 | 1.42 | 1.62 |
| 200% Modulus | 2.00 | 1.93 | 1.89 | 2.22 |
| 300% Modulus | 3.71 | 3.57 | 3.51 | 4.18 |
| Tensile Str (MPa) | 16.80 | 13.94 | 13.71 | 14.19 |
| Elongation (%) | 822 | 760 | 761 | 709 |
| Energy, (J) | 196.25 | 164.08 | 154.00 | 154.85 |
| Hardness @ RT | 56.4 | 56.7 | 57.0 | 58.6 |
| Hardness @ 100° | 44.4 | 43.4 | 43.5 | 45.6 |
| Rebound @ RT | 31.1 | 32.2 | 33.0 | 33.8 |
| Rebound @ 100° | 45.1 | 44.8 | 45.3 | 46.1 |

[1]GF-80
[2]Prepared in Example 1

When the unvulcanized rubber (Sample 1) is treated with 20.0 parts of recycled rubber (Sample 2), delta torque values drop from 21.3 to 18.4. Addition of recycled rubber treated with dithiodipropionic acid (Sample 3) also results in a significant decrease from 21.3 to 19.1. Quite surprisingly, addition of recycled rubber treated with tetrathiodipropionic acid resulted in the delta torque values being essentially maintained. The high delta torque value is an indication of increased cure and crosslink density in the rubber and suggests that the recycled rubber is cured into the unvulcanized rubber. The higher final torque values for Sample 4 versus Samples 1–3 indicate the superiority of the present invention. Higher crosslink densities are shown for the present invention (Sample 4) when looking at values for 300 percent modulus, 200 percent modulus, 150 percent modulus and 100 percent modulus.

What is claimed is:

1. A process for improving the properties of ground recycled rubber comprising
   (a) homogeneously dispersing from 0.18 to 10.8 phr of 3,3'-tetrathiodipropionic acid in a recycled rubber compound which has an individual particle size no greater than 420 microns to form a treated recycled rubber compound;
   (b) mixing from 1 to 40 parts by weight of said treated recycled rubber compound with 60 to 99 parts by weight of at least one unvulcanized rubber to form a recycled/unvulcanized rubber compound;
   (c) heating the recycled/unvulcanized rubber compound for a time sufficient and at a temperature to vulcanize all of the rubber in the recycled/unvulcanized rubber compound.

2. The process of claim 1 wherein the 3,3'-tetrathiodipropionic acid is dispersed in a solvent prior to being homogeneously dispersed in said vulcanized rubber.

3. The process of claim 2 wherein said solvent is selected from the group consisting of acetone, chloroform, dichloromethane, carbon tetrachloride, hexane, heptane, cyclohexane, xylene, benzene, dichloroethylene, dioxane, diisopropyl ether, tetrahydrofuran and toluene.

4. The process of claim 3 wherein said solvent is acetone.

5. The process of claim 1 wherein the particle size is no greater than 250 microns.

6. The process of claim 1 wherein the particle size ranges from 250 microns to 74 microns.

7. The process of claim 1 wherein from 0.36 to 5.0 phr of 3,3'-tetrathiodipropionic acid is homogeneously dispersed.

8. The process of claim 1 wherein the tetrathiodipropionic acid is dispersed directly on the recycle rubber.

9. The process of claim 1 wherein said unvulcanized rubber is selected from the group consisting of natural rubber, polybutadiene, polyisobutylene, EPDM, butadiene-styrene copolymers, cis-1,4-polyisoprene, styrene-isoprene copolymers, butadiene-styrene-isoprene copolymers, polychloroprenes and mixtures thereof.

10. The process of claim 1 wherein said unvulcanized rubber is selected from the group consisting of polybutadiene, butadiene-styrene copolymers and mixtures thereof.

11. The process of claim 1 wherein from 2 to 30 parts by weight of said treated recycled rubber compound is mixed with 70 to 98 parts by weight of said unvulcanized rubber compound.

* * * * *